Dec. 24, 1957   M. B. JAMISON ET AL   2,817,569
RECEPTACLE
Filed Dec. 28, 1953                    2 Sheets-Sheet 2
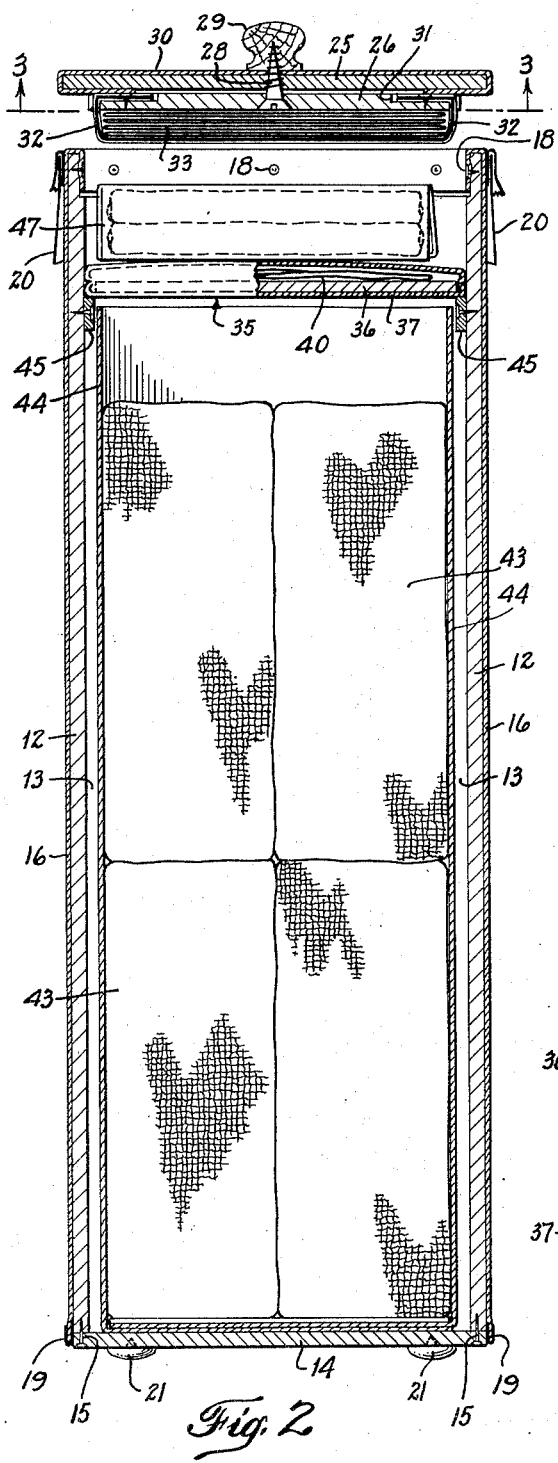
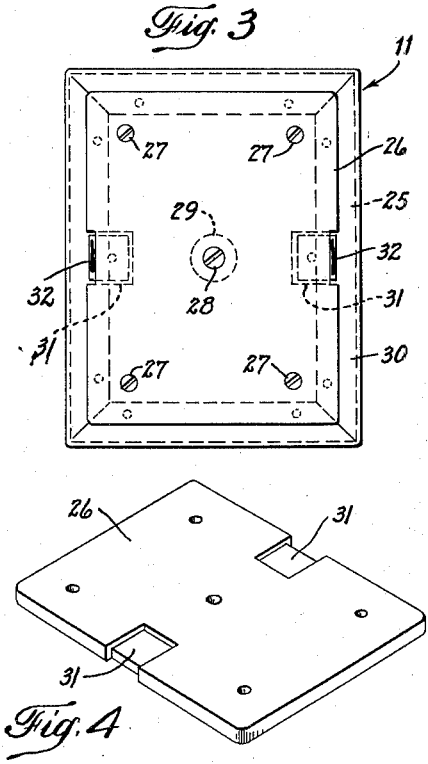
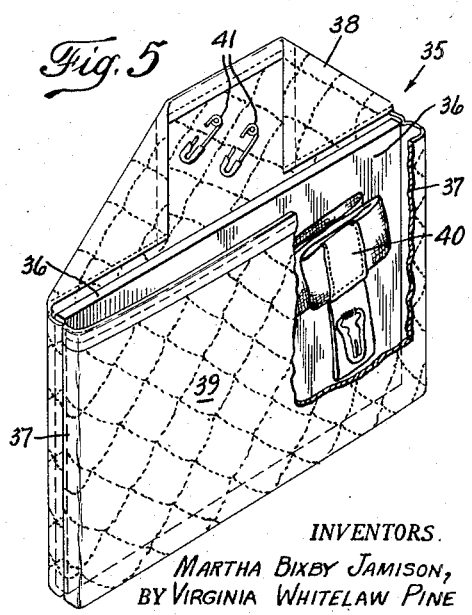
INVENTORS.
MARTHA BIXBY JAMISON,
BY VIRGINIA WHITELAW PINE
Morgan, Finnegan, Durham & Pine
ATTORNEYS.

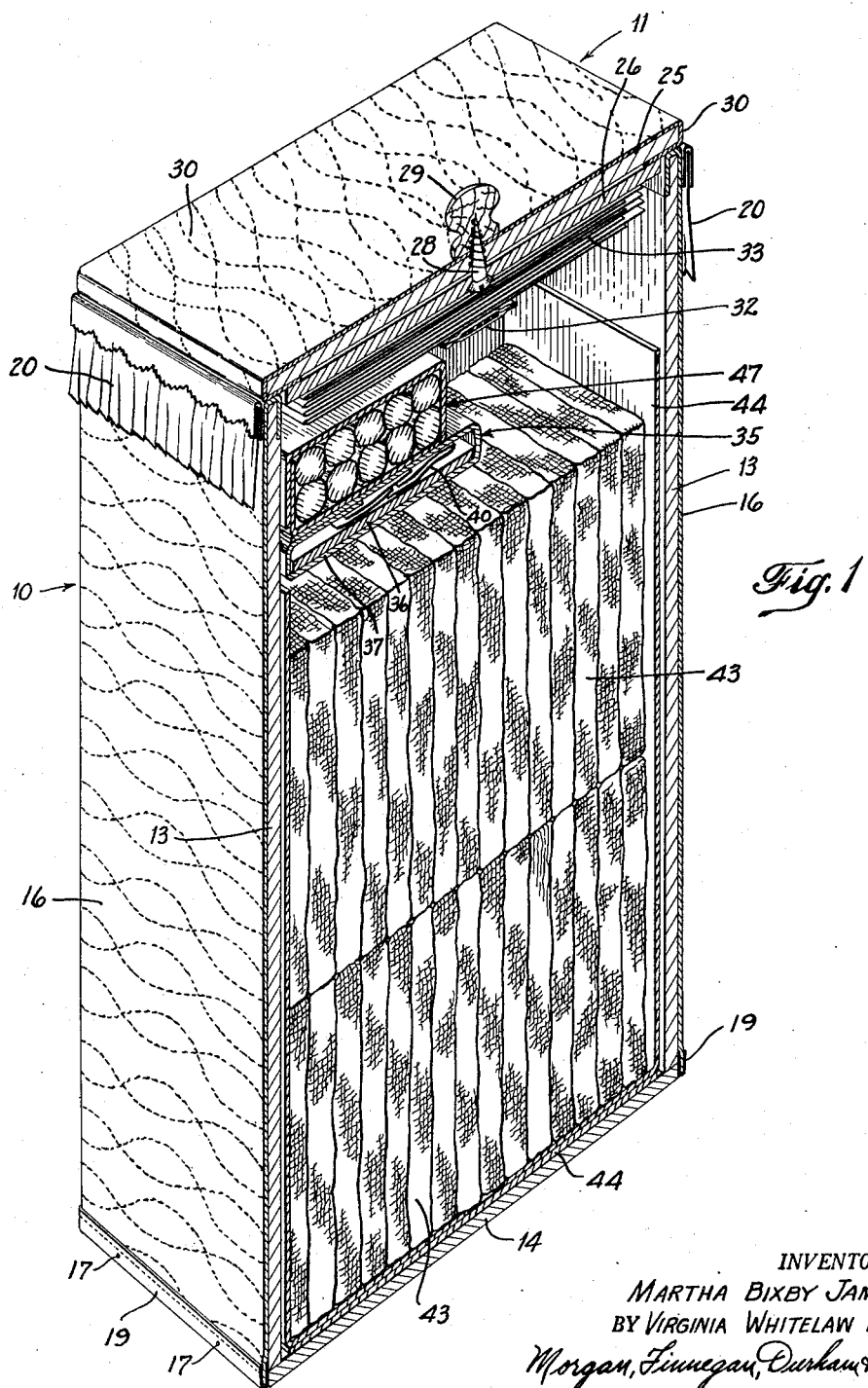

United States Patent Office 2,817,569
Patented Dec. 24, 1957

2,817,569
RECEPTACLE

Martha Bixby Jamison, Wyomissing, Pa., and Virginia Whitelaw Pine, Scarsdale, N. Y.

Application December 28, 1953, Serial No. 400,575

3 Claims. (Cl. 312—293)

The present invention relates to a receptacle, and more particularly to an efficient and attractive receptacle for the holding and storing of catamenial appliances and related devices.

Objects and advantages of the invention will be set forth in part hereinafter and in part will be obvious herefrom, or may be learned by practice with the invention, the same being realized and atttained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a vertical longitudinal sectional view along a central plane and in perspective of a receptacle fabricated in accordance with the invention, the receptacle being shown with catamenial pads, tampons and other articles for use in association therewith in place in the receptacle;

Fig. 2 is a vertical sectional view in a central plane of the receptacle and its contents shown in Fig. 1, the section being that disposed at a 90° angle to the section shown in Fig. 1, the top of the receptacle being shown in removed position whereby access to the contents may be had;

Fig. 3 is a bottom plane view of the removable top of the receptacle, certain positions being shown in section, the view being taken along line 3—3 of Fig. 2;

Fig. 4 is a perspective view of one of the elements which are assembled to form the top of the receptacle, showing details of the formation thereof; and, Fig. 5 is a perspective view, with parts broken away to show the interior thereof, of the shiftable shelf and envelope member forming a part of the receptacle of the invention, and shown in assembled relationship in Figs. 1 and 2 of the drawings.

The present invention provides an attractive receptacle wherein may be efficiently gathered and stored for ready use the various catamenial appliances and devices used with them which are customarily used by women. The receptacle of the invention is particularly useful when placed in the closet, bedroom or bathroom, making readily available the various articles stored within it, gathering them together in logical and efficient order, and at the same time shielding the nature and identity of the contents so as to obviate embarrassment, providing for view of the casual observer only as attractive receptacle present in the room. In the illustrative form herein shown and described, the invention comprises a rectangular container provided with a removable top, both of which may be and preferably are attactively covered or otherwise decorated, as for instance by a quilted fabric often used on the exterior of closet appliances. The container is adapted to receive a package of catamenial bandages or sanitary napkins, which preferably may be the commercial package in which the articles are sold, with the top removed for access to the napkins. The receptacle of the invention comprises a shiftable shelf and envelope to be positioned over the package of napkins, of such proportions that its may be shifted transversely of the container and always permit access to the napkins beneath it. The said shelf and envelope are adapted to conveniently receive and store such appliances as a sanitary belt and pins to be used therewith, and itself forms a support for other appliances to be housed in the receptacle, such as a box of catamenial tampons. The top of the container is provided with holding means to receive, store, and make easily available, a supply of envelopes or sacks which are desirable for disposal purposes with used napkins or tampons.

It will be understood that the foregoing general description and the following detailed description as well are exemplary and explanatory of the invention but are not restrictive thereof.

Referring now in detail to the illustrative embodiment of the invention shown by way of example in the accompanying drawings, the container generally is indicated by the numeral 10 and includes a removable top 11. The container may be made of any suitable material, shown as wood in the embodiment of the invention disclosed, and is rectangular in shape, comprising a pair of side panels 12, a pair of end panels 13, the latter being the minor dimension of the container, and a bottom panel 14, all suitably secured together as for instance by nails 15. Preferably slide feet 21 are provided on the bottom 14. The exterior of the container 12 is preferably decorated in some attractive way, and in the embodiment shown the exterior surfaces of the vertical panels 12 and 13 are covered with a relatively heavy, quilted, plastic material 16 which is tacked to the panels as indicated at 17 and 18. The appearance of the receptacle may further be enhanced by use of a binding tape 19 at the bottom, and a gathered and scalloped trim 20 at the top. The quilted material 16 is a type quite widely used for covering the exterior of closet boxes and the like, and may be obtained in a variety of colors, thus allowing the receptacle of the invention to assume a conventional and attractive appearance, and also to conform to the decoration of the bedroom, closet, or other place.

It will be apparent that the receptacle of the invention may be decorated or covered in numerous other ways. For instance, we have found a very desirable article is provided by completely covering the exterior surfaces of panels 12 and 13, and top 11, with mirrors, which are glued or otherwise suitably affixed to the surfaces.

The top 11 for container 10 illustratively comprises a top panel 25 which is preferably rectangular and of such dimensions to rest on and cover the upper edges of side panels 12 and 13. A second panel member 26 is provided, secured to the underside of panel 25 by means of screws 27, and also by screw 28 which holds in place the knob 29 on the top of panel 25. The second panel 26 is rectangular and of such dimensions as to be received snugly within the open top of container 10 between panels 12 and 13, so that the top 11 will not be accidentally transversely dislodged from the container, but will be purposely lifted when it is removed.

The top panel 25 is also covered with material 30 similar to that described in connection with covering 16, the same being conveniently held by its outer edges extending under the panel 25 and between panels 25 and 26 as shown. The second panel 26 may be fashioned with a pair of relieved places indicated by the numeral 31 (Fig. 4) centrally of opposed edges thereof, extending into the surface which is adapted to lie toward the under surface of panel 25 (Fig. 2). Said relieved places are adapted to receive the ends of a band 32 of elastic or the like, which may be stapled or otherwise firmly secured to panel 26, and thus to assembled top 11. The ends of the elastic 32 thus does not unduly interfere with the assembling of panels 25 and 26.

As shown, the elastic band 32 extends across the lower surface of panel 26 (and thus top 11), providing a convenient place for holding and storing a plurality of bags or sacks 33, which may be individually withdrawn as desired for use in disposing of used catamenial articles, leaving the balance of the bags 33 in position for future use.

The shiftable shelf and envelope member is indicated generally by the numeral 35 (Fig. 5), and comprises a rectangular stiffening member 36 which is adapted to fit within an envelope 37. The envelope 37 may be made of any suitable fabric, plastic, or other material, in the illustrative embodiment the material being shown as the same as coverings 16 and 30. Said envelope 37 is proportioned to loosely receive the stiffening element 36, and is formed with a flap 38 which may be tucked between the element 36 and panel 39 of the envelope in closing the assembled shelf and envelope.

As shown in Fig. 5, the shelf and envelope 35 is adapted to receive a sanitary belt 40, and the flap 38 provides a place to receive safety pins 41 pinned into the fabric, so that all such articles are readily and conveniently available for use.

The shelf and envelope member 35, when closed with the flap 38 tucked in as described above, is adapted to be positioned within container 10, as shown in Figs. 1 and 2, above a supply of sanitary napkins indicated by the numeral 43. The napkins 43 may preferably be contained in the commercial package or container 44 in which they are sold, from which the top has been removed and the package and contents inserted in container 10. The package 44 shown in the present illustrative embodiment is a large or economy size provided by the makers of such napkins, and the receptacle of the invention is particularly useful and convenient when adapted for use with such packages. It will be obvious, however, that the invention may be adapted for use with other sizes of packages, or without reference to such packages at all.

The shelf and envelope member 35 is of such size as to fit within container 10, and to rest upon a pair of transverse supports 45, each secured to a respective side panel 12 on the inner surface thereof and, preferably, at a position adjacent the end of the napkin container 44 having its end removed. The dimensions of the shelf and envelope member are such that it may be shifted across the interior of container 10 along supports 45 so that access may always be had to the napkins beneath without removing the member 35 from the container 10. A width for the shelf and envelope member 35 of about one-half the distance between panels 13 of container 10 is found to be quite convenient and efficient.

The member 35, in addition to providing a place for storage of belt 40 and pins 41, when positioned within container 10, serves as a shelf upon which a box of catamenial tampons 47 may be stored. As has been described, the member 35 and whatever is supported thereon, such as tampon box 47, may easily be shifted across container 10 to make napkins 43 always available, and the member 35 may be readily removed to have access to the belt and pins therein. It will be appreciated that the supports 45 are not essential and may be dispensed with, as the member 35 may be supported upon the upper edges of the container 44, and the member 35 will be slidable and removable in the same way.

The invention is not limited in its broader aspects to the specific mechanisms shown and described but departures may be made therefrom, within the scope of the accompanying claims, without departing from the principles of the invention and without sacrificing its chief advantages.

What is claimed is:

1. A device of the character described comprising in combination, an upstanding walled container having its vertical dimension substantially greater than its horizontal dimension, the lower portion of said container defining a compartment to receive sanitary napkins therein, the upper wall of said container being formed as a removable cover therefor, resilient means secured to the underside of said cover for engaging and holding disposal sacks flat against said cover and within said container, said resilient means and sacks held thereby being removable with the cover, a shelf and envelope member assembly transversely positioned and supported within said container in a plane immediately above and substantially parallel to the sanitary napkin compartment and below said cover to receive and support a supply of tampons thereon without interference with the disposal sacks on said cover when the latter are in place on the container, horizontal supporting means secured on the inner walls of the container to support the shelf and envelope member assembled in sliding relationship therewith, said assembly being supported by said supporting means and lying closely adjacent certain of the wall portions and substantially spaced from other wall portions to permit transverse sliding of said assembly within said container, said shelf and envelope member comprising a stiffening portion of relatively stiff sheet material relatively closely surrounded by a flexible, openable and closable envelope portion for receiving a sanitary belt and pins.

2. A device as set forth in claim 1 wherein said container is rectangular and adapted to receive a correspondingly shaped package of sanitary napkins through the top thereof with said cover removed, and said shelf and envelope member is rectangularly shaped and is horizontally slidable between two opposed vertical walls of said container.

3. The device as set forth in claim 1 wherein said resilient means comprises a strip of elastic secured at either end to said cover on the under surface thereof adjacent opposed edges of said cover.

References Cited in the file of this patent

UNITED STATES PATENTS

| Re. 19,955 | Marshall | May 5, 1936 |
| 308,672 | Howd | Dec. 2, 1884 |
| 630,183 | Connell | Aug. 1, 1899 |
| 961,784 | Matthews | June 21, 1910 |
| 1,444,350 | Levy | Feb. 6, 1923 |

FOREIGN PATENTS

| 378,069 | Germany | July 4, 1923 |